(12) United States Patent
Rong et al.

(10) Patent No.: US 10,380,373 B2
(45) Date of Patent: Aug. 13, 2019

(54) NETWORK, METHOD AND COMPUTER PROGRAM PRODUCT FOR ORGANIZING AND PROCESSING DATA

(71) Applicant: Dataunitor AS, Stavanger (NO)

(72) Inventors: Chunming Rong, Stavanger (NO); Erdal Cayirci, Hafrsfjord (NO)

(73) Assignee: Dataunitor AS, Stavanger (NO)

( * ) Notice: Subject to any disclaimer, the term of this patent is extended or adjusted under 35 U.S.C. 154(b) by 162 days.

(21) Appl. No.: 15/698,347

(22) Filed: Sep. 7, 2017

(65) Prior Publication Data

US 2019/0073487 A1 Mar. 7, 2019

(51) Int. Cl.
*G06F 21/62* (2013.01)
*G06F 21/64* (2013.01)
*H04L 9/30* (2006.01)
*H04L 29/06* (2006.01)

(52) U.S. Cl.
CPC .......... *G06F 21/6227* (2013.01); *G06F 21/64* (2013.01); *H04L 9/30* (2013.01); *H04L 63/0442* (2013.01); *H04L 63/12* (2013.01); *H04L 2209/38* (2013.01)

(58) Field of Classification Search
CPC ....... G06F 21/6227; G06F 21/64; H04L 9/30; H04L 63/0442; H04L 63/12; H04L 2209/38
See application file for complete search history.

(56) References Cited

U.S. PATENT DOCUMENTS

| 2005/0076226 A1* | 4/2005 | Boivie | G06F 21/575 713/187 |
|---|---|---|---|
| 2017/0163733 A1 | 6/2017 | Grefen et al. | |
| 2017/0228371 A1 | 8/2017 | Seger, II | |

OTHER PUBLICATIONS

EP International Search Report for PCT/EP2018/073874 dated Nov. 12, 2018.
(Continued)

*Primary Examiner* — Eleni A Shiferaw
*Assistant Examiner* — Bassam A Noaman
(74) *Attorney, Agent, or Firm* — Moore & Van Allen PLLC; W. Kevin Ransom (57) ABSTRACT

Collecting nodes receive data from multiple data sources via a communication structure. The data is processed to generate at least one meta data block reflecting information about objects of interest represented by the data content. The at least one meta data block is encrypted. The data is divided into data chunks of a respective predefined size, and encrypted. The encrypted data chunks and meta blocks are sent over the communication structure to fusion nodes, where, after decryption, meta data blocks are fused into a new meta data block if an object-of-interest criterion is fulfilled. The new meta data blocks are encrypted and sent over the communication structure. Data storage nodes store copies of the encrypted data chunks and meta data blocks in an information structure of block chains of encrypted meta data blocks organized in one chain per object of interest. A user interface forwards any search query to an information processing unit; which, in response thereto, presents resulting information retrieved from the data storage nodes.

11 Claims, 3 Drawing Sheets

(56) References Cited

OTHER PUBLICATIONS

Arvind Narayanan, Joseph Bonneau, Edward Felten, Andrew Miller, Steven Goldfeder with a preface by Jeremy Clark;Draft—Feb 9, 2016; Bitcoin and Cryptocurrency Technologies; Published by Princeton University Press in 2016.

Chaim Zins; "Conceptual Approaches for Defining Data, Information, and Knowledge"; Journal of the American Society for Information Science and Technology; 58(4):479-493, Feb. 15, 2007.

\* cited by examiner

NETWORK, METHOD AND COMPUTER PROGRAM PRODUCT FOR ORGANIZING AND PROCESSING DATA

FIELD OF THE INVENTION

Embodiments presented herein relate to a network, a method, and a computer program product for organizing and processing data.

BACKGROUND OF THE INVENTION

In this document, we refer to the DIKW pyramid, also known variously as the DIKW hierarchy. The DIKW pyramid represents structural and/or functional relationships between data, information, knowledge and wisdom, and is described e.g. Zins, C., "Conceptual Approaches for Defining Data, Information, and Knowledge", Journal of the American Society for Information and Technology, Feb. 15, 2007; pp 479-493, Wiley InterScience.

In the context of DIKW, data is conceived of as symbols or signs, representing stimuli or signals that are "of no use until . . . in a usable form." Data can be characterized "as being discrete, objective facts or observations, which are unorganized and unprocessed and therefore have no meaning or value because of lack of context and interpretation." In short, data can here be defined as "chunks of facts about the state of the world."

Further, in the context of DIKW, information "is contained in descriptions" and is differentiated from data in that it is "useful." More precisely, "information is inferred from data" in the process of answering interrogative questions (e.g., "who?", "what?", "where?", "how many?", "when?"), thereby making the data useful for "decisions and/or action." In other words, information can be defined as "data that are endowed with meaning and purpose."

The knowledge component of DIKW is generally agreed to be an elusive concept, which is somewhat difficult to define. The DIKW view is that knowledge is defined with reference to information, for example "as information having been processed, organized or structured in some way, or else as being applied or put into action." Knowledge can also be referred to as "a fluid mix of framed experience, values, contextual information, expert insight and grounded intuition that provides an environment and framework for evaluating and incorporating new experiences and information."

Although commonly included as a level in DIKW, there is limited reference to wisdom in discussions of the model. Nevertheless, under the DIKW concept, wisdom can be described as "know-why", or "why do" (in contrast to "why is", which is information), Wisdom can also be expanded to include a form of know-what ("what to do, act or carry out"). In general terms, wisdom can be described as "integrated knowledge—information made super-useful".

In any case, processing the immense amounts of digital data produced by for example information-sensing Internet-of-things devices, such as mobile devices, aerial (remote sensing), software logs, cameras, microphones, radio-frequency identification readers and wireless sensor networks into information and/or knowledge is a highly complex task. Maintaining data integrity is also important to ensure the quality of the resulting information and/or knowledge.

SUMMARY OF THE INVENTION

An object of the present invention is therefore to mitigate the above problems and offer an efficient and reliable solution for handling extremely large amounts of data and information.

Another object of the invention is to enable users to find adequate search results in response to specific queries relating to the collected information.

According to one aspect of the invention, these objects are obtained by a network for processing data and information, including: a communication structure, a number of collecting nodes, a number of fusion nodes, a number of data storage nodes and a user interface. The communication structure contains routers/switches and communication links providing communicative interconnections between nodes. Each collecting node is connected to the communication structure and has an input interface configured to receive data from multiple data sources. A data processing unit in each collecting node is configured to process the received data to generate a number of meta data blocks reflecting information about the content of the received data. The information relates to at least one object of interest represented by the content. The data processing unit is further configured to: divide the received data into data chunks of a respective predefined size, encrypt each of said meta data blocks with a private key of the collecting node to generate encrypted meta data blocks, and encrypt each data chunk with a public key of the network to generate encrypted data chunks. An output interface in the data processing unit is configured to send out the encrypted data chunks and the encrypted meta data blocks over the communication structure. Each encrypted data chunk is sent out with a link to the encrypted meta data block generated therefrom.

A number of fusion nodes are connected to the communication structure. Each of these fusion nodes has an input interface configured to receive the encrypted data chunks and the encrypted meta data blocks via the communication structure. An information processing unit in the fusion node is configured to: decrypt the received encrypted meta data blocks to generate respective decrypted meta data blocks; process the decrypted meta data blocks to check if the information reflected by at least two decrypted meta data blocks fulfills a fusion criterion with respect to an object of interest; and if so, fuse the information reflected by said at least two meta data blocks to generate a new meta data block with information relating to the object of interest represented by the content of the at least two encrypted data chunks based on which the new meta data block was generated. The information processing unit in the fusion node is further configured to encrypt the new meta data block to generate an encrypted new meta data block. An output interface in the fusion node is configured to send out the encrypted new meta data block over the communication structure.

A number of data storage nodes are connected to the communication structure. Each of these data storage nodes has an input interface, a database and an output interface. The input interface is configured to receive the encrypted data chunks and the encrypted meta data blocks from the communication structure. The database is configured to store copies of the encrypted meta data blocks and at least a part of the encrypted data chunks. The copies of the encrypted meta data blocks are stored in response to instructions from the information processing unit of a fusion node that is associated with the data storage node. The instructions are such that an information structure is created wherein: each object of interest is represented by one block chain of encrypted meta data blocks in which all the encrypted meta data blocks relate to the same object of interest, a respective copy of an encrypted meta data block that relates to two or more objects of interest is included in each block chain of encrypted meta data blocks relating to said two or more objects of interest, and a first received encrypted meta data block being related to a particular combination of objects of interests represented by two or more previously stored block chains of encrypted meta data blocks constitutes a joint between said two or more previously stored block chains of encrypted meta data blocks. The output interface is configured to send out a description of the information structure over the communication structure.

A user interface is arranged in communicative connection with the information processing unit of at least one of the fusion nodes. The user interface is configured to receive a search query, forward the search query to the information processing unit, receive information resulting from the search query from the information processing unit and present the resulting information. The information processing unit in the fusion node is further configured to receive the search query, in response thereto retrieve information from a database in at least one of said data storage nodes, and forward the retrieved information to the user interface.

This network is advantageous because it provides automatic contextualizing of vast amounts of data from a multitude of data sources. The network also enables visualization of the data, for example via the user interface. Thereby, information and knowledge can be gained in an efficient and intuitive manner. Moreover, the proposed block chain structure and encryption provides data integrity and data security. Thus, high-quality results are ensured.

According to one embodiment of this aspect of the invention, the network further contains at least two information structure storage nodes. Each of these nodes is connected to the communication structure, and, in turn, includes an input interface, a database and an output interface. The input interface is configured to receive the encrypted data meta data blocks from the communication structure. The database is configured to store copies of the encrypted meta data blocks. The copies of the encrypted meta data blocks are stored according to the information structure based on the objects of interest, such that: each object of interest is represented by one block chain of encrypted meta data blocks in which all the encrypted meta data blocks relate to the same object of interest. Here, a respective copy of an encrypted meta data block that relates to two or more objects of interest is included in each block chain of encrypted meta data blocks relating to said two or more objects of interest. A first received encrypted meta data block being related to a particular combination of objects of interests represented by two or more previously stored block chains of encrypted meta data blocks constitutes a joint between these two or more previously stored block chains of encrypted meta data blocks. The output interface is configured to send out a description of the information structure over the communication structure.

This is advantageous because it maintains an object-of-interest based structure, and, at the same time, any joints express combinations of objects of interests in an intuitive way.

Preferably, in response to the search query received from the user interface, the information processing unit of the at least one fusion node the user interface, is configured to retrieve information from a database in at least one of said at least two information structure storage nodes and forward the retrieved information to the user interface as the information resulting from the search query.

According to another aspect of the invention, the object is achieved by a distributed method of processing data and information in a network containing nodes, wherein a communication structure of routers/switches and communication links provide communicative interconnections between the nodes, and the method involves: receiving, in each of a number of collecting nodes connected to the communication structure, data from multiple data sources; processing, in each of said number of collecting nodes, the received data to generate a number of meta data blocks reflecting information about the content of the received data, the information relating to at least one object of interest represented by the content; dividing, in each of said number of collecting nodes, the received data into data chunks of a respective predefined size; encrypting, in each of said number of collecting nodes, each meta data block with a private key of the collecting node to generate encrypted meta data blocks; encrypting, in each of said number of collecting nodes, each data chunk with a public key of the network to generate encrypted data chunks; and sending out, from each of said number of collecting nodes, the encrypted data chunks and the encrypted meta data blocks over the communication structure, each encrypted data chunk being sent out with a link to the encrypted meta data block generated therefrom; receiving, in each of a number of fusion nodes connected to the communication structure, the encrypted data chunks and the encrypted meta data blocks via the communication structure; decrypting, in each of a number of fusion nodes, the received encrypted meta data blocks to generate respective decrypted meta data blocks; process, in each of a number of fusion nodes, the decrypted meta data blocks to check if the information reflected by at least two decrypted meta data blocks fulfills a fusion criterion with respect to an object of interest; and if so, fusing the information reflected by said at least two meta data blocks to generate a new meta data block with information relating to the object of interest represented by the content of the at least two encrypted data chunks based on which the new meta data block was generated; encrypting, in each of a number of fusion nodes, the new meta data block to generate an encrypted new meta data block; sending out, from each of said number of fusion nodes, the encrypted new meta data block over the communication structure; receiving, in each of a number of data storage nodes connected to the communication structure, the encrypted data chunks and the encrypted meta data blocks from the communication structure; storing, in each of said number of data storage nodes, in a database, copies of the encrypted meta data blocks and at least a part of the encrypted data chunks, the copies of the encrypted meta data blocks being stored in response to instructions from the information processing unit of a fusion node that is associated with the data storage node, said instructions being such that an information structure is created wherein: each object of interest is represented by one block chain of encrypted meta data blocks in which all the encrypted meta data blocks relate to the same object of interest, a respective copy of an encrypted meta data block that relates to two or more objects of interest is included in each block chain of encrypted meta data blocks relating to said two or more objects of interest, and a first received encrypted meta data block being related to a particular combination of objects of interests represented by two or more previously stored block chains of encrypted meta data blocks constitutes a joint between said two or more previously stored block chains of encrypted meta data blocks; sending out, from each of said number of data storage nodes, a description of the information structure over the communication structure; receiving, in a user interface arranged in communicative connection with the information processing unit of at least one of said fusion nodes, a search query; forwarding the search query from the user interface to the information processing unit; receiving the search query in the information processing unit; and in response thereto retrieving information from a database in at least one of said data storage nodes; forwarding the retrieved information to the user interface; receiving, in the user interface, the retrieved information; and presenting the retrieved information.

The advantages of this method, as well as the preferred embodiments thereof, are apparent from the discussion above with reference to the proposed network.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DETAILED DESCRIPTION OF THE INVENTION

Figure 1:
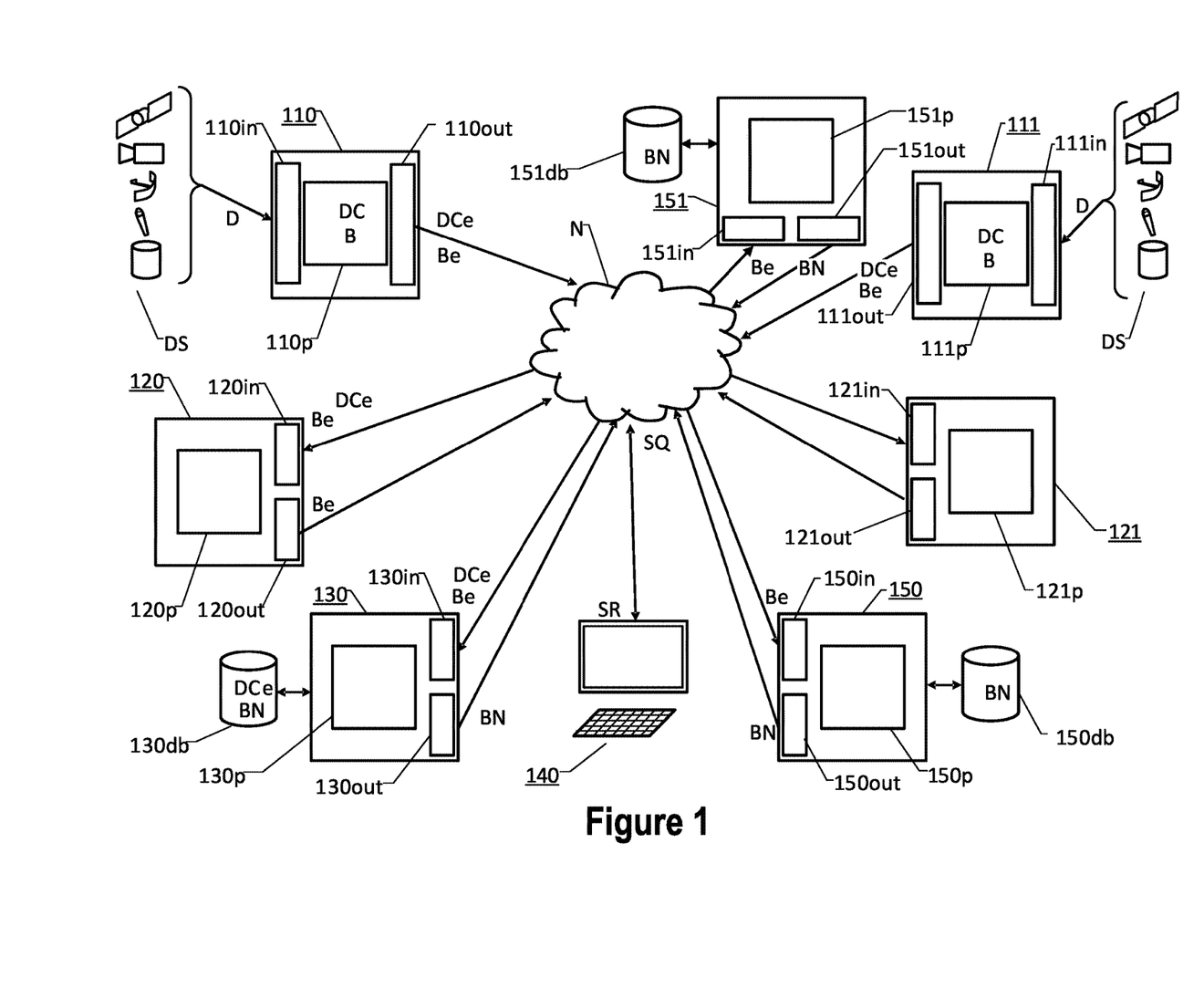
FIG. 1 schematically shows a network for processing data and information according to an embodiment of the invention.

FIG. 1 depicts a schematic network for processing data and information according to an embodiment of the invention.

The network includes a communication structure N, a number of collecting nodes 110 and 111, a number of fusion nodes 120 and 121, at least one data storage node 130 and at least one user interface 140.

The communication structure N contains routers/switches and communication links configured to provide communicative interconnections between nodes.

Each of the collecting nodes 110 and 111 is connected to the communication structure N and, in turn, contains an input interface 110in and 111in respectively configured to receive data D from multiple data sources DS for example video cameras, still cameras, radars, sonars, text banks and/or audio recorders. Each of the collecting nodes 110 and 111 also contains a data processing unit 110$p$ and 111$p$ respectively configured to: process the received data D to generate a number of meta data blocks B reflecting information about the content of the received data D. The information relates to at least one object of interest represented by the content. Further, the data processing unit 110$p$ and 111$p$ is configured to divide the received data D into data chunks DC of a respective predefined size; encrypt each of the meta data blocks B with a private key of the collecting node to generate encrypted meta data blocks Be; and encrypt each data chunk DC with a public key of the network to generate encrypted data chunks DCe. An output interface 110out and 111out in each of the collecting nodes 110 and 111 respectively is configured to send out the encrypted data chunks DCe and the encrypted meta data blocks Be over the communication structure N. Here, each encrypted data chunk DCe is sent out with a link to the encrypted meta data block Be generated therefrom. Hence, each outgoing encrypted data chunk DCe is associated with at least one adequate object of interest.

Each of the fusion nodes 120 and 121 is connected to the communication structure N, and, in turn, contains: an input interface 120in and 121in respectively, an information processing unit 120$p$ and 121$p$ respectively and an output interface 120out and 121out respectively.

The input interface 120in/121in is configured to receive the encrypted data chunks DCe and the encrypted meta data blocks Be via the communication structure N.

The information processing unit 120$p$/121$p$ is configured to decrypt the received encrypted meta data blocks Be to generate respective decrypted meta data blocks B. The information processing unit 120$p$/121$p$ is also configured to process the decrypted meta data blocks B to check if the information reflected by at least two decrypted meta data blocks B fulfills a fusion criterion with respect to an object of interest. If such a criterion is fulfilled, the information processing unit 120$p$/121$p$ is configured to fuse the information reflected by said at least two meta data blocks B to generate a new meta data block B with information relating to the object of interest represented by the content of the at least two encrypted data chunks DCe based on which the new meta data block B was generated. Moreover, the information processing unit 120$p$/121$p$ is configured to encrypt the new meta data block B to generate an encrypted new meta data block Be.

The output interface 120out/121out is configured to send out the encrypted new meta data block Be over the communication structure N The data storage node 130 is connected to the communication structure N, and, in turn, contains: an input interface 130in, a database 130$db$ and an output interface 130out. The input interface 130in is configured to receive the encrypted data chunks DCe and the encrypted meta data blocks Be from the communication structure N. The database 130$db$ is configured to store copies of the encrypted meta data blocks and at least a part of the encrypted data chunks DCe. The copies of the encrypted meta data blocks Be are stored in response to instructions from the information processing unit 120$p$/121$p$ of a fusion node 120/121 that is associated with the data storage node. Specifically, the instructions are such that an information structure BN is created wherein: each object of interest is represented by one block chain of encrypted meta data blocks in which all the encrypted meta data blocks relate to the same object of interest; a respective copy of an encrypted meta data block that relates to two or more objects of interest is included in each block chain of encrypted meta data blocks relating to said two or more objects of interest; and a first received encrypted meta data block being related to a particular combination of objects of interests represented by two or more previously stored block chains of encrypted meta data blocks constitutes a joint between said two or more previously stored block chains of encrypted meta data blocks. The output interface 130out is configured to send out a description of the information structure BN over the communication structure N.

The user interface 140 is arranged in communicative connection with the information processing unit 120$p$ of at least one of the fusion nodes, say 120. The user interface 140 is configured to receive a search query SQ, forward the search query SQ to the information processing unit 120$p$, receive information SR resulting from the search query SQ from the information processing unit 120$p$ and present the resulting information SR. The information processing unit 120$p$ is further configured to receive the search query SQ; in response thereto, retrieve information SR from a database 130$db$ in at least one of said data storage nodes 130; and forward the retrieved information SR to the user interface 140.

Preferably, the network further includes at least two information structure storage nodes. In FIG. 1, reference signs 150 and 151 represent such nodes. Each of the information structure storage nodes 150 and 151 is connected to the communication structure N and contains: an input interface 150in and 151in respectively, a database 150db and 150db respectively, and an output interface 150out and 151out respectively.

The input interface 150in/151in is configured to receive the encrypted meta data blocks Be from the communication structure N and forward the encrypted meta data blocks Be to the database 150db/150db. The database 150db/150db is configured to store copies of the encrypted meta data blocks according to the information structure BN based on the objects of interest. The output interface 150out/151out is configured to send out a description of the information structure BN over the communication structure N.

According to one embodiment of the invention, in response to the search query SQ received from the user interface 140, the information processing unit 120p is configured to retrieve information SR (typically a search result) from one of the databases, say 150db, in one of the information structure storage nodes 150 and forward the retrieved information to the user interface 140 as the information SR resulting from the search query SQ.

It is further advantageous if the information processing unit 120p and 121p respectively in each of said fusion nodes 120 and 121 is configured to encrypt any new meta data block B with a private key of the fusion node 120/121 to generate an encrypted new meta data block Be. Naturally, each of the output interfaces 120out and 121out respectively is further configured to send out the encrypted new meta data blocks over the communication structure N. Analogously, each of the input interfaces 120in and 121in is further configured to receive encrypted new meta data blocks from at least one other fusion node via the communication structure N.

The information processing unit 120p/121p is further configured to process the received encrypted meta data blocks Be and the received encrypted new meta data such that relevant databases are adequately updated. The encrypted meta data blocks Be are meta data blocks that have already been processed and inserted into the information structure BN by another fusion node. The encrypted new meta data originates from collecting nodes, and said encrypted new meta data has not yet been processed by any fusion node.

In practice, the information processing unit 120p/121p in each of the fusion nodes 120/121 may implement this by: maintaining a first queue of encrypted meta data blocks Be received from the at least one other fusion node, i.e. 121 and 120 respectively; maintaining a second queue of encrypted new meta data received from at least one collecting node 110/111; and processing the first queue with priority over the second queue, such that the encrypted new meta data of the second queue are processed after that all the encrypted meta data blocks Be of the first queue have been processed.

The following three steps represent one example of how this may be implemented.

Step A1: Check if the encrypted meta data block Be or the encrypted new meta data has not been received before. If it turns out that the encrypted new meta data is a copy of meta data already received, discard it, and terminate the process. Otherwise, insert the block into the information structure BN, and proceed to Step 2.

Step A2: Validate the information structure BN. If the information structure BN cannot be validated, inform the fusion node 120/121 from which the encrypted meta data block Be originated and remove the encrypted meta data block Be from the information structure BN. The validation process as such will be elaborated upon below.

Step A3: If the information structure BN can be validated after the insertion of the encrypted meta data block Be, and if the related encrypted new meta data is already received in the second queue, remove the encrypted meta data from the new meta data queue and store it. As mentioned earlier, each of the fusion nodes 120/121 stores the information structure BN and the encrypted meta data blocks Be, each fusion node 120/121 only stores a subset of the actual data, i.e. the encrypted data chunks DCe.

According to one embodiment of the invention, the information processing unit 120p and 121p respectively in each of the fusion nodes 120/121 is configured to perform a validity check of the received encrypted meta data blocks Be and the received encrypted new meta data in connection with instructing the information structure storage node 150/151 to store a copy of an encrypted meta data block Be or an encrypted new meta data block Be. If the validity check is passed the fusion node is instructed to store a copy of an encrypted meta data block Be or an encrypted new meta data. If, however, the validity check fails, an originating fusion node 120/121 from which the encrypted meta data block Be or encrypted new meta data was sent out is instructed to correct the database 130db of the data storage node 130 associated with the originating fusion node 120/121.

The validity check may encompass a shape-validity check and/or a content-validity check. The shape-validity check involves removing any duplicate encrypted meta data blocks Be from the information structure BN, which duplicate encrypted meta data blocks Be are located in the same block chain. Further, a shorter branch of any non-orphaned forks in the same block chain is marked as an orphan block OB.

The content-validity check involves checking the content of the encrypted meta data blocks Be against a set of consistency rules, and removal of any encrypted meta data block Be from the information structure BN that does not comply with the set of consistency rules.

The below-described algorithm may be used for processing the meta data. When an encrypted new meta data is received and there is no encrypted meta data block Be to be processed (i.e. the above-mentioned first queue is empty), the meta data processing involves the following five steps.

Step B1: Check if the encrypted meta data is new, i.e.:

B1.1 Check that the encrypted new meta data is not a copy of already received encrypted new meta data. If such a copy is encountered, the encrypted new meta data is discarded and the process is terminated.

B1.2 Check if the encrypted new meta data is already processed by another fusion node and an encrypted meta data block Be is received for that. If there is already an encrypted meta data block Be in the information structure BN for the new meta data in question, remove encrypted new meta data from the queue, and terminate the process.

Step B2: Decrypt the encrypted new meta data by using the public key of the collecting node from which the encrypted new meta data was broadcasted.

Step B3: Generate a new meta data block B from the new meta data. This may involve creating a hash value for each object of interest OI, time and location. A nonce may further be assigned to the block, and a timestamp is preferably also added.

Step B4: Encrypt the new meta data block B into an encrypted new meta data block Be, and insert the encrypted new meta data block Be into the information structure BN. As explained above, depending on the object(s) of interest OI included in the meta data, this may cause a fork F, a joint J or a new chain in the information structure BN. Subsequently, the information structure BN is validated against two types of criteria:

B4.1 Shape Validity: Check the information structure BN against the existence of duplicate encrypted meta data blocks Be. If such blocks are detected, all of them except one are removed from the information structure BN, and all the fusion nodes 120/121 are informed about this by broadcasting a message. The information structure BN is also checked against non-orphaned forks in the same chain. If such are detected, a last encrypted meta data block Be in the shorter branch is marked as orphan block OB, and all the fusion nodes 120/121 are informed about that.

B4.2 Content Validity: Check the information structure BN against the space and time consistency of the object(s) of interest OI based on a set of rules configured by a system administrator. For example, if the block indicates that an object of interest OI (e.g. a person) who cannot move faster than six km per hour has moved 100 km in 10 minutes, this is a time and space inconsistency. Such blocks are marked as "not valid" and all other fusion nodes 120/121 are informed about this. The actions to be taken for "not valid" encrypted meta data blocks Be can be either fully autonomous, or involve human engagement.

Step B5: If the encrypted meta data block Be is successfully validated and it has not been inserted into the information structure BN by another fusion node 120/121 in the meantime, the information about the encrypted new meta data block Be is broadcasted to the fusion nodes 120/121.

Figure 2:
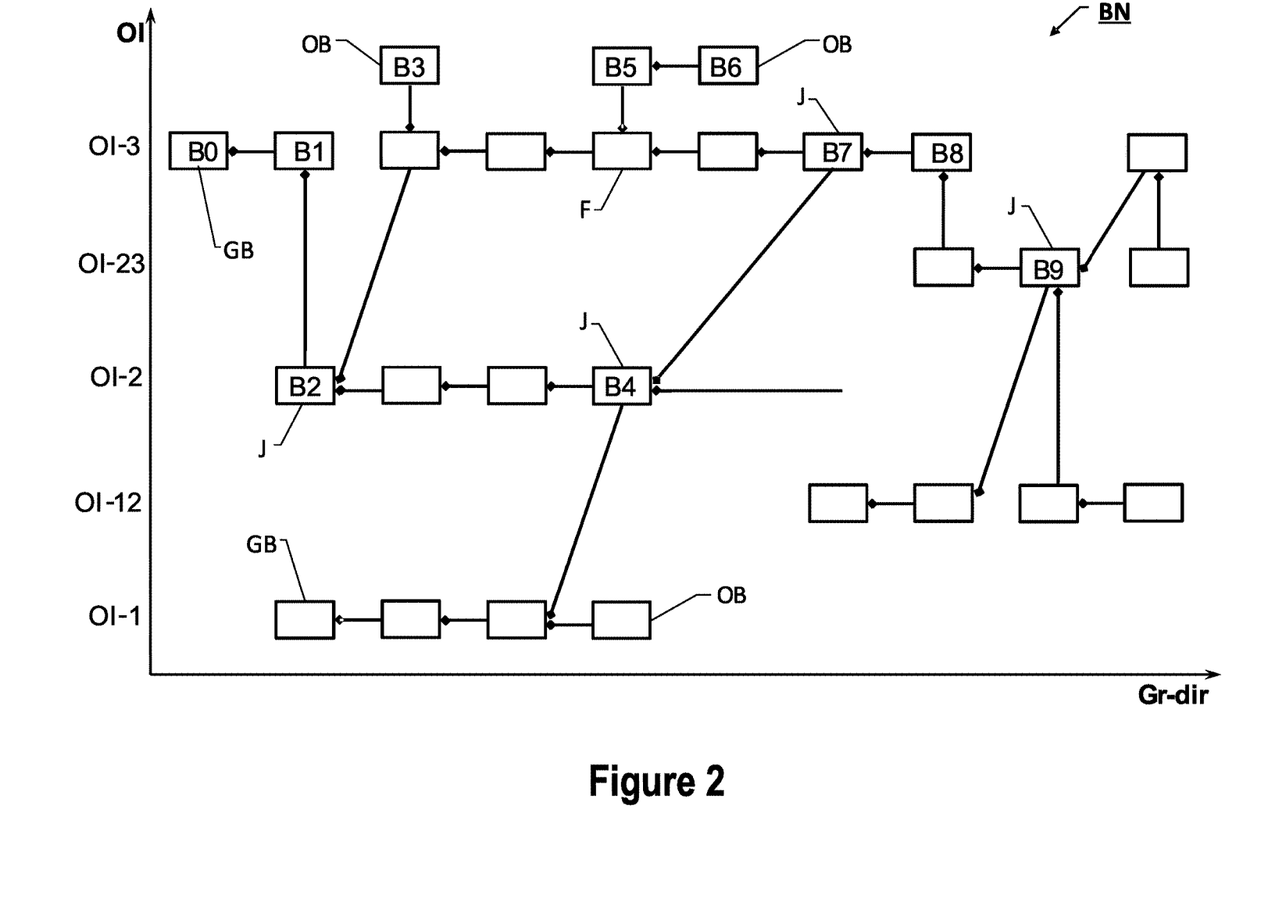
FIG. 2 illustrates a proposed information structure.

Referring now to FIG. 2, we will explain how each object of interest OI is represented by one block chain of encrypted meta data blocks in which all the encrypted meta data blocks relate to the same object of interest. FIG. 2 shows different objects of interests OI-1, OI-12, OI-2, OI-23 and OI-3 along the vertical axis as separate block chains. An object of interest OI may be a person, a vehicle, an incident, a phenomenon, etc. The horizontal axis in FIG. 2 reflects a direction Gr-dir along which the information structure BN grows as more encrypted meta data blocks are added. A respective copy of an encrypted meta data block that relates to two or more objects of interest OI is included in each block chain of encrypted meta data blocks relating to these objects of interest OI.

For example, data can be a picture or video of a person, vehicle or an accident. The encrypted meta data blocks include information such as identification, features, location and time of an object of interest OI. Naturally the data can relate to multiple objects of interest OI, and therefore the encrypted meta data may include information about multiple objects of interest OI.

In FIG. 2, one object of interest OI-3 has a first encrypted meta data block B0, which is also denoted a genesis block GB. A first received encrypted meta data block that is related to a particular combination of objects of interests OI represented by two or more previously stored block chains of encrypted meta data blocks constitutes a joint J between these two or more previously stored block chains of encrypted meta data blocks. Here, such joints J are exemplified by an encrypted meta data block B2 between objects of interest OI-2 and OI-3, by an encrypted meta data block B4 between objects of interest OI-1 and OI-2, by an encrypted meta data block B7 between objects of interest OI-2 and OI-3, and by an encrypted meta data block B9 between objects of interest OI-12 and OI-23.

The information structure BN in FIG. 2 also exemplifies a fork F before an encrypted meta data block B5 in the interest OI-3. The forked branch is then terminated at an orphan block OB in the form of an encrypted meta data block B6. Thus, the fork F is the opposite of the joint J; or in other words, a joint J is a reverse fork F.

If a new encrypted meta data block is about one or more objects of interest OI that are not included in the information structure BN before, that encrypted meta data block becomes a genesis block GB for a new chain. One genesis block GB can also relate to multiple objects of interest OI. In other words, a chain may likewise relate to multiple objects of interest OI. In FIG. 2, the genesis block GB B0 is the genesis block for both the object of interest OI-3 and OI-2 due to the joint J in the encrypted meta data block B2.

Now, to further clarify, we will explain how the information structure BN is generated with reference to an example. Assume that one object of interest OI-3 concerns a person named Sarah, another object of interest OI-2 concerns a bus (i.e. a vehicle), and yet another object of interest OI-1 concerns traffic accidents.

The genesis block GB in the form of the encrypted meta data block B0 includes meta data about a picture of the bus when Sarah is in the bus.

The encrypted meta data block B2 is another picture of the bus and Sarah together.

An orphan block OB in the form of another encrypted meta data block B3 is a video of the bus when Sarah is still in the bus.

After the encrypted meta data block B3, other pieces of data are collected both about the bus and Sarah when they are separate from one another. This is represented by chains extending in the direction Gr-dir for each of the objects of interest OI.

An encrypted meta data block B4 contains data about when the bus is in the same picture as an accident, i.e. the object of interest OI-1.

In yet another encrypted meta data block B7, the chains for the objects of interest OI-2 and OI-3 join J because Sarah entered the bus before the related data is collected.

An encrypted meta data block B9 relates to data showing that the bus is involved in an accident with Sarah in it. Therefore, the chains for all the objects of interest OI-1, OI-2 and OI-3 join J at B9.

Figure 3:
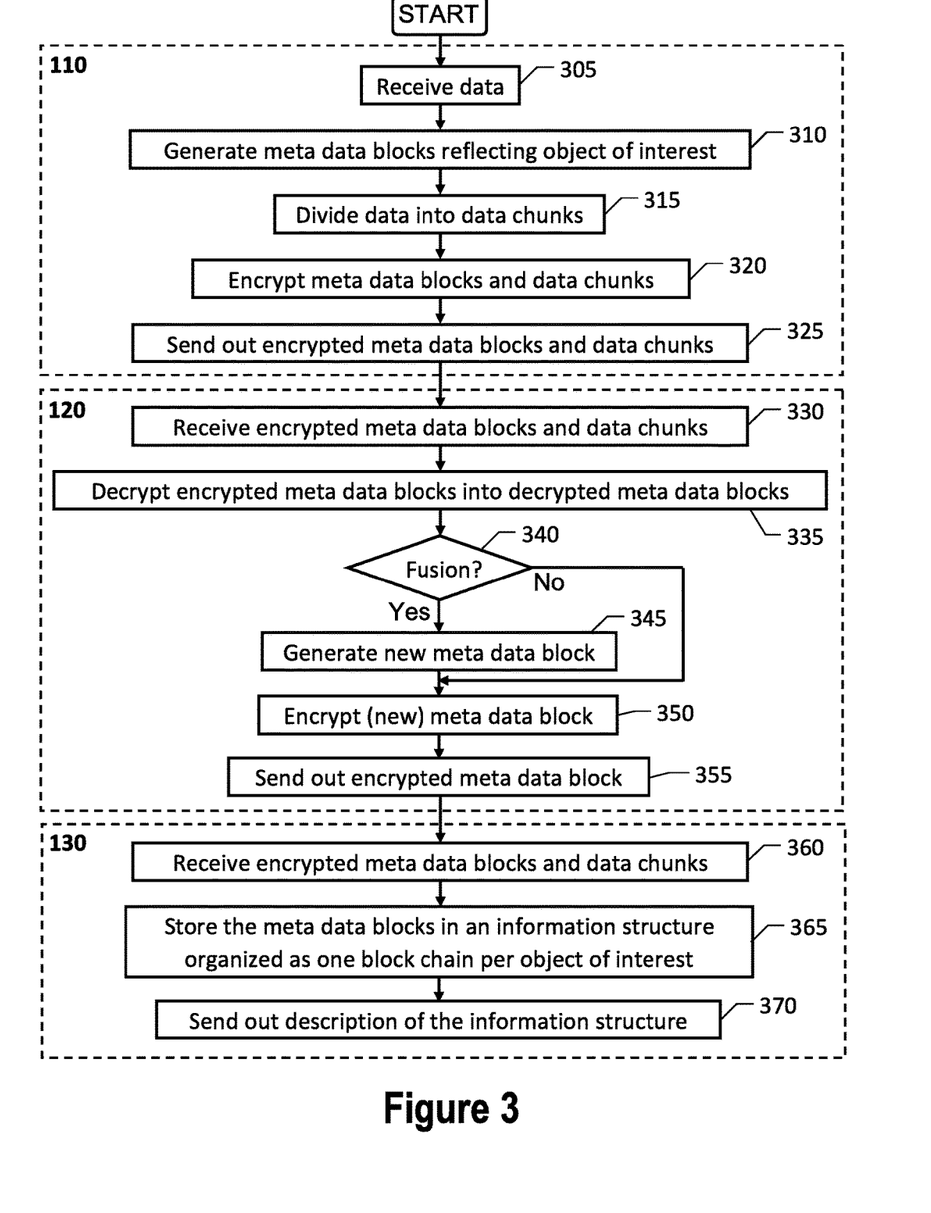
FIG. 3 illustrates, by means of a flow diagram, a method according to one embodiment of the invention.

To sum up, and with reference to the flow diagram in FIG. 3, we will now describe a distributed method according to the invention of processing data and information in a network including nodes, a communication structure of routers/switches and communication links interconnecting the nodes. In FIG. 3, a first dashed box 110 symbolizes a general collecting node, a second dashed box 120 symbolizes a general fusion node and a third dashed box 130 symbolizes a general data storage node. For clarity, however, the steps performed in the user interface in connection with entering a search query are not illustrated in FIG. 3.

In a first step 305, data is received in the collecting node 110. The data may originate from a variety of sources and may represent many different kinds of data producers (e.g. video cameras, still cameras, radars, text banks, audio recorders), have various formats (bmp, jpeg, tiff, mpeg, pdf, word, ascii) and/or represent various resolutions and sizes. In a subsequent step 310, the data is processed to generate a number of meta data blocks reflecting information about the received data. Here, the information relates to at least one object of interest represented by the content. Thereafter, in a step 315, the received data is divided into data chunks of a respective predefined size. Then, in a step 320, each meta data block is encrypted with a private key of the collecting node to generate a corresponding encrypted meta data block; and, each data chunk is encrypted with a public key of the network to generate a respective encrypted data chunk. After that, in a step 325, the encrypted data chunks and the encrypted meta data blocks are sent out over the communication structure. More precisely, each encrypted data chunk is sent out with a link to the encrypted meta data block generated therefrom.

In a step 330 following step 325 and executed in the fusion node 120, the encrypted data chunks and the encrypted meta data blocks are received from the communication structure. Thereafter, in a step 335, the encrypted meta data blocks are decrypted to generate respective decrypted meta data blocks. Subsequently, a step 340 processes the decrypted meta data blocks to check if the information reflected by at least two decrypted meta data blocks fulfills a fusion criterion with respect to an object of interest. If the fusion criterion is fulfilled, a step 345 follows, and otherwise the procedure continues to a step 350. In step 345, the information reflected by the at least two meta data blocks is fused to generate a new meta data block with information relating to the object of interest represented by the content of the at least two encrypted data chunks based on which the new meta data block was generated. Thereafter, in a step 350, the meta data block is encrypted to generate an encrypted meta data block. Depending on if the procedure enters step 350 from step 345 or 340, the encrypted meta data block may either be an encrypted new meta data block, or merely a re-encryption of a block decrypted in step 335. In any case, after step 350 follows a step 355 in which the encrypted new meta data block is sent out over the communication structure.

In a step 360 following step 355 and executed in the data storage node 130, the encrypted data chunks and the encrypted meta data blocks are received from the communication structure.

Subsequently, in a step 365, copies of the encrypted meta data blocks and at least a part of the encrypted data chunks are stored in a database. Here, the copies of the encrypted meta data blocks are stored such that an information structure is created wherein: (i) each object of interest is represented by one block chain of encrypted meta data blocks in which all the encrypted meta data blocks relate to the same object of interest, (ii) a respective copy of an encrypted meta data block that relates to two or more objects of interest is included in each block chain of encrypted meta data blocks relating to said two or more objects of interest, and (iii) a first received encrypted meta data block being related to a particular combination of objects of interests represented by two or more previously stored block chains of encrypted meta data blocks constitutes a joint between said two or more previously stored block chains of encrypted meta data blocks. After that, in a step 370, a description of the information structure is sent out from the data storage node over the communication structure. Consequently, for example search queries can be processed based on the information structure.

All of the process steps of FIG. 3 may be controlled by means of at least one programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a non-transitory storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A network for processing data and information, the network comprising:
   a communication structure of routers/switches and communication links configured to provide communicative interconnections between nodes;
   a number of collecting nodes each of which is connected to the communication structure and comprises:
   an input interface configured to receive data from multiple data sources;
   a data processor configured to:
   process the received data to generate a number of meta data blocks reflecting information about the content of the received data, the information relating to at least one object of interest represented by the content;
   divide the received data into data chunks of a respective predefined size;
   encrypt each of said meta data blocks with a private key of the collecting node to generate encrypted meta data blocks; and
   encrypt each data chunk with a public key of the network to generate encrypted data chunks; and
   an output interface configured to send out the encrypted data chunks and the encrypted meta data blocks over the communication structure, each encrypted data chunk being sent out with a link to the encrypted meta data block generated therefrom;
   a number of fusion nodes each of which is connected to the communication structure and comprises:
   an input interface configured to receive the encrypted data chunks and the encrypted meta data blocks via the communication structure;
   an information processor configured to:
   decrypt the received encrypted meta data blocks to generate respective decrypted meta data blocks;
   process the decrypted meta data blocks to check for when the information reflected by at least two decrypted meta data blocks fulfills a fusion criterion with respect to an object of interest; and fuse the information reflected by said at least two meta data blocks to generate a new meta data block with information relating to the object of interest represented by the content of the at least two encrypted data chunks based on which the new meta data block was generated;

encrypt the new meta data block to generate an encrypted new meta data block; and an output interface configured to send out the encrypted new meta data block over the communication structure;

a number of data storage nodes each of which is connected to the communication structure and comprises:

an input interface configured to receive the encrypted data chunks and the encrypted meta data blocks from the communication structure;

a database configured to store copies of the encrypted meta data blocks and at least a part of the encrypted data chunks, the copies of the encrypted meta data blocks being stored in response to instructions from the information processor of a fusion node that is associated with the data storage node, said instructions being such that an information structure is created wherein:

each object of interest is represented by one block chain of encrypted meta data blocks in which all the encrypted meta data blocks relate to the same object of interest;

a respective copy of an encrypted meta data block that relates to two or more objects of interest is included in each block chain of encrypted meta data blocks relating to said two or more objects of interest; and a first received encrypted meta data block being related to a particular combination of objects of interests represented by two or more previously stored block chains of encrypted meta data blocks constitutes a joint between said two or more previously stored block chains of encrypted meta data blocks; and an output interface configured to send out a description of the information structure over the communication structure; and a user interface arranged in communicative connection with the information processor of at least one of said fusion nodes, which user interface is configured to receive a search query, forward the search query to the information processor, receive information resulting from the search query from the information processor and present the resulting information, said information processor of said at least one fusion node being further configured to receive the search query, in response thereto retrieve information from a database in at least one of said data storage nodes, and forward the retrieved information to the user interface, wherein in each of said fusion nodes, the information processor is further configured to encrypt any new meta data block with a private key of the fusion node to generate an encrypted new meta data block;

the output interface is further configured to send out the encrypted new meta data blocks over the communication structure;

the input interface is further configured to receive encrypted new meta data blocks from at least one other fusion node via the communication structure; and the information processor is further configured to process the received encrypted meta data blocks and the received encrypted new meta data blocks such that the database of a data storage node or an information structure storage node associated with the fusion node is instructed to store a copy of an encrypted meta data block or an encrypted new meta data block only when there exists no earlier copy of the encrypted meta data block or the encrypted new meta data block in said database, and the information processor is further configured to perform a validity check of the received encrypted meta data blocks and the received encrypted new meta data blocks in connection with instructing the information structure storage node to store a copy of an encrypted meta data block or an encrypted new meta data block, when the validity check is passed, instruct the fusion node to store a copy of an encrypted meta data block or an encrypted new meta data block, and when the validity check fails, instruct an originating fusion node from which the encrypted meta data block or encrypted new meta data block was sent out to correct the database of the data storage node associated with the originating fusion node.

2. The network according to claim 1, further comprising at least two information structure storage nodes each of which is connected to the communication structure and comprises:

an input interface configured to receive the encrypted data meta data blocks from the communication structure;

a database configured to store copies of the encrypted meta data blocks, the copies of the encrypted meta data blocks being stored according to the information structure based on the objects of interest such that:

each object of interest is represented by one block chain of encrypted meta data blocks in which all the encrypted meta data blocks relate to the same object of interest;

a respective copy of an encrypted meta data block that relates to two or more objects of interest is included in each block chain of encrypted meta data blocks relating to said two or more objects of interest; and a first received encrypted meta data block being related to a particular combination of objects of interests represented by two or more previously stored block chains of encrypted meta data blocks constitutes a joint between said two or more previously stored block chains of encrypted meta data blocks; and an output interface configured to send out a description of the information structure over the communication structure.

3. The network according to claim 2, wherein said information processor of said at least one fusion node, in response to the search query received from the user interface, is configured to retrieve information from a database in at least one of said at least two information structure storage nodes and forward the retrieved information to the user interface as the information resulting from the search query.

4. The network according to claim 1, wherein the information processor in each of said fusion nodes is further configured to:

maintain a first queue of encrypted new meta data blocks received from the at least one other fusion node;

maintain a second queue of encrypted meta data blocks received from at least one collecting node; and process the first queue with priority over the second queue such that the encrypted meta data blocks of the second queue are processed after that all the encrypted new meta data blocks of the first queue have been processed.

5. The network according to claim 1, wherein the validity check comprises at least one of a shape-validity check and a content-validity check, the shape-validity check involving removal of any duplicate encrypted meta data blocks from the information structure, which duplicate encrypted meta data blocks are located in the same block chain, and marking a shorter branch of any non-orphaned forks in the same block chain as an orphan block; and the content-validity check involving checking the content of the encrypted data chunks against a set of consistency rules, and removal of any encrypted meta data block from the information structure that does not comply with the set of consistency rules.

6. A distributed method of processing data and information in a network comprising nodes, a communication structure of routers/switches and communication links provide communicative interconnections between the nodes, the method comprising:

receiving, in each of a number of collecting nodes connected to the communication structure; data from multiple data sources;

processing, in each of said number of collecting nodes, the received data to generate a number of meta data blocks reflecting information about the content of the received data, the information relating to at least one object of interest represented by the content;

dividing, in each of said number of collecting nodes, the received data into data chunks of a respective predefined size;

encrypting, in each of said number of collecting nodes, each meta data block with a private key of the collecting node to generate encrypted meta data blocks;

encrypting, in each of said number of collecting nodes, each data chunk with a public key of the network to generate encrypted data chunks; and sending out, from each of said number of collecting nodes, the encrypted data chunks and the encrypted meta data blocks over the communication structure, each encrypted data chunk being sent out with a link to the encrypted meta data block generated therefrom;

receiving, in each of a number of fusion nodes connected to the communication structure, the encrypted data chunks and the encrypted meta data blocks via the communication structure;

decrypting, in each of a number of fusion nodes, the received encrypted meta data blocks to generate respective decrypted meta data blocks;

processing, in each of a number of fusion nodes, the decrypted meta data blocks to check for instances where the information reflected by at least two decrypted meta data blocks fulfills a fusion criterion with respect to an object of interest; and fusing the information reflected by said at least two meta data blocks to generate a new meta data block with information relating to the object of interest represented by the content of the at least two encrypted data chunks based on which the new meta data block was generated;

encrypting, in each of a number of fusion nodes, the new meta data block to generate an encrypted new meta data block;

sending out, from each of said number of fusion nodes, the encrypted new meta data block over the communication structure;

receiving, in each of a number of data storage nodes connected to the communication structure, the encrypted data chunks and the encrypted meta data blocks from the communication structure;

storing, in each of said number of data storage nodes, in a database, copies of the encrypted meta data blocks and at least a part of the encrypted data chunks, the copies of the encrypted meta data blocks being stored in response to instructions from the information processor of a fusion node that is associated with the data storage node, said instructions being such that an information structure is created wherein:

each object of interest is represented by one block chain of encrypted meta data blocks in which all the encrypted meta data blocks relate to the same object of interest;

a respective copy of an encrypted meta data block that relates to two or more objects of interest is included in each block chain of encrypted meta data blocks relating to said two or more objects of interest; and a first received encrypted meta data block being related to a particular combination of objects of interests represented by two or more previously stored block chains of encrypted meta data blocks constitutes a joint between said two or more previously stored block chains of encrypted meta data blocks;

sending out, from each of said number of data storage nodes, a description of the information structure over the communication structure;

receiving, in a user interface arranged in communicative connection with the information processor of at least one of said fusion nodes, a search query;

forwarding the search query from the user interface to the information processor;

receiving the search query in the information processor, and in response thereto retrieving information from a database in at least one of said data storage nodes;

forwarding the retrieved information to the user interface;

receiving, in the user interface, the retrieved information;

presenting the retrieved information;

encrypting, in each of a number of fusion nodes, any new meta data block with a private key of the fusion node to generate an encrypted new meta data block;

sending, from each of said number of fusion nodes, out the encrypted new meta data blocks over the communication structure;

receiving, in each of a number of fusion nodes, encrypted new meta data blocks from at least one other fusion node via the communication structure;

processing, in each of a number of fusion nodes, the received encrypted meta data and the received encrypted new meta data blocks such the database of a data storage node or an information structure storage node that is associated with the fusion node is instructed to store a copy of an encrypted meta data block or an encrypted new meta data block only when there exists no earlier copy of the encrypted meta data block or the encrypted new meta data block in said database;

performing, in each of a number of fusion nodes, a validity check of the received encrypted meta data blocks and the received encrypted new meta data blocks in connection with instructing the information structure storage nodes to store a copy of an encrypted meta data block or an encrypted new meta data block; and when the validity check is passed, instructing the fusion node to store a copy of an encrypted meta data block or encrypted new meta data; and when the validity check fails,
instructing an originating fusion node from which the encrypted meta data block was sent out to correct the database of the data storage node associated with the originating fusion node.

7. The method according to claim 6, wherein the network further comprises at least two information structure storage nodes each of which is connected to the communication structure, and the method further comprises:

receiving, in each of said information structure storage nodes, the encrypted data meta data blocks from the communication structure;

storing, in each of said information structure storage nodes, a database, copies of the encrypted meta data blocks, the copies of the encrypted meta data blocks being stored according to the information structure based on the objects of interest such that:

each object of interest is represented by one block chain of encrypted meta data blocks in which all the encrypted meta data blocks relate to the same object of interest;

a respective copy of an encrypted meta data block that relates to two or more objects of interest is included in each block chain of encrypted meta data blocks relating to said two or more objects of interest; and a first received encrypted meta data block being related to a particular combination of objects of interests represented by two or more previously stored block chains of encrypted meta data blocks constitutes a joint between said two or more previously stored block chains of encrypted meta data blocks; and sending out, from each of said information structure storage nodes, a description of the information structure over the communication structure.

8. The method according to claim 7, comprising, in response to receiving the search query in said information processor of said at least one fusion node, the method comprises:

retrieving information from a database in at least one of said at least two information structure storage nodes; and forward the retrieved information to the user interface.

9. The method according to claim 6, further comprising, in each of said fusion nodes:

maintaining a first queue of encrypted meta data blocks received from the at least one other fusion node;

maintaining a second queue of encrypted new meta data received from at least one collecting node; and processing the first queue with priority over the second queue such that the encrypted new meta data of the second queue are processed after that all the encrypted meta data blocks of the first queue have been processed.

10. The method according to claim 6, wherein the validity check comprises at least one of a shape-validity check and a content-validity check;

the shape-validity check involving removal of any duplicate encrypted meta data blocks from the information structure, which duplicate encrypted meta data blocks are located in the same block chain; and marking a shorter branch of any non-orphaned forks in the same block chain as an orphan block; and the content-validity check involving checking the content of the encrypted data chunks against a set of consistency rules, and removal of any encrypted meta data block from the information structure that does not comply with the set of consistency rules.

11. A computer program product comprising computer program code stored in a non-transitory computer-readable medium readable by a computer, said computer program product used for processing data and information in a network comprising nodes, a communication structure of routers/switches and communication links provide communicative interconnections between the nodes, said computer program code comprising computer instructions to cause one or more computer processors to perform the following operations:

receiving, in each of a number of collecting nodes connected to the communication structure; data from multiple data sources;

processing, in each of said number of collecting nodes, the received data to generate a number of meta data blocks reflecting information about the content of the received data, the information relating to at least one object of interest represented by the content;

dividing, in each of said number of collecting nodes, the received data into data chunks of a respective predefined size;

encrypting, in each of said number of collecting nodes, each meta data block with a private key of the collecting node to generate encrypted meta data blocks;

encrypting, in each of said number of collecting nodes, each data chunk with a public key of the network to generate encrypted data chunks; and sending out, from each of said number of collecting nodes, the encrypted data chunks and the encrypted meta data blocks over the communication structure, each encrypted data chunk being sent out with a link to the encrypted meta data block generated therefrom;

receiving, in each of a number of fusion nodes connected to the communication structure, the encrypted data chunks and the encrypted meta data blocks via the communication structure;

decrypting, in each of a number of fusion nodes, the received encrypted meta data blocks to generate respective decrypted meta data blocks;

processing, in each of a number of fusion nodes, the decrypted meta data blocks to check for instances where the information reflected by at least two decrypted meta data blocks fulfills a fusion criterion with respect to an object of interest; and fusing the information reflected by said at least two meta data blocks to generate a new meta data block with information relating to the object of interest represented by the content of the at least two encrypted data chunks based on which the new meta data block was generated;

encrypting, in each of a number of fusion nodes, the new meta data block to generate an encrypted new meta data block;

sending out, from each of said number of fusion nodes, the encrypted new meta data block over the communication structure;

receiving, in each of a number of data storage nodes connected to the communication structure, the encrypted data chunks and the encrypted meta data blocks from the communication structure;

storing, in each of said number of data storage nodes, in a database, copies of the encrypted meta data blocks and at least a part of the encrypted data chunks, the copies of the encrypted meta data blocks being stored in response to instructions from the information processor of a fusion node that is associated with the data storage node, said instructions being such that an information structure is created wherein:

each object of interest is represented by one block chain of encrypted meta data blocks in which all the encrypted meta data blocks relate to the same object of interest;

a respective copy of an encrypted meta data block that relates to two or more objects of interest is included in each block chain of encrypted meta data blocks relating to said two or more objects of interest; and a first received encrypted meta data block being related to a particular combination of objects of interests represented by two or more previously stored block chains of encrypted meta data blocks constitutes a joint between said two or more previously stored block chains of encrypted meta data blocks;

sending out, from each of said number of data storage nodes, a description of the information structure over the communication structure;

receiving, in a user interface arranged in communicative connection with the information processor of at least one of said fusion nodes, a search query;

forwarding the search query from the user interface to the information processor;

receiving the search query in the information processor, and in response thereto retrieving information from a database in at least one of said data storage nodes;

forwarding the retrieved information to the user interface;

receiving, in the user interface, the retrieved information; and presenting the retrieved information;

encrypting, in each of a number of fusion nodes, any new meta data block with a private key of the fusion node to generate an encrypted new meta data block;

sending, from each of said number of fusion nodes, out the encrypted new meta data blocks over the communication structure;

receiving, in each of a number of fusion nodes, encrypted new meta data blocks from at least one other fusion node via the communication structure;

processing, in each of a number of fusion nodes, the received encrypted meta data and the received encrypted new meta data blocks such the database of a data storage node or an information structure storage node that is associated with the fusion node is instructed to store a copy of an encrypted meta data block or an encrypted new meta data block only when there exists no earlier copy of the encrypted meta data block or the encrypted new meta data block in said database;

performing, in each of a number of fusion nodes, a validity check of the received encrypted meta data blocks and the received encrypted new meta data blocks in connection with instructing the information structure storage nodes to store a copy of an encrypted meta data block or an encrypted new meta data block; and when the validity check is passed,
    instructing the fusion node to store a copy of an encrypted meta data block or encrypted new meta data; and when the validity check fails,
    instructing an originating fusion node from which the encrypted meta data block was sent out to correct the database of the data storage node associated with the originating fusion node.

* * * * *